(12) United States Patent
Langhammer

(10) Patent No.: US 10,521,194 B2
(45) Date of Patent: *Dec. 31, 2019

(54) MIXED-PRECISION FLOATING-POINT ARITHMETIC CIRCUITRY IN SPECIALIZED PROCESSING BLOCKS

(71) Applicant: INTEL CORPORATION, Santa Clara, CA (US)

(72) Inventor: Martin Langhammer, Salisbury (GB)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,248

(22) Filed: Dec. 20, 2018

(65) Prior Publication Data

US 2019/0196786 A1    Jun. 27, 2019

Related U.S. Application Data

(63) Continuation of application No. 15/485,248, filed on Apr. 12, 2017, now Pat. No. 10,175,944.

(51) Int. Cl.
   *G06F 7/487* (2006.01)
   *G06F 7/544* (2006.01)
   *G06F 17/16* (2006.01)

(52) U.S. Cl.
   CPC .......... *G06F 7/4876* (2013.01); *G06F 7/5443* (2013.01); *G06F 17/16* (2013.01); *G06F 2207/3816* (2013.01)

(58) Field of Classification Search
   None
   See application file for complete search history.

(56) References Cited

U.S. PATENT DOCUMENTS

| | | | |
|---|---|---|---|
| 4,825,400 A | 4/1989 | Simoncic et al. | |
| 5,630,160 A | 5/1997 | Simpson et al. | |
| 6,081,821 A | 6/2000 | Hopkinson et al. | |
| 6,163,791 A * | 12/2000 | Schmookler | G06F 7/535 708/502 |
| 7,428,566 B2 | 9/2008 | Siu et al. | |

(Continued)

*Primary Examiner* — Michael D. Yaary
(74) *Attorney, Agent, or Firm* — Fletcher Yoder, P.C.

(57) ABSTRACT

The present embodiments relate to integrated circuits with circuitry that efficiently performs mixed-precision floating-point arithmetic operations. Such circuitry may be implemented in specialized processing blocks. The specialized processing blocks may include configurable interconnect circuitry to support a variety of different use modes. For example, the specialized processing blocks may implement fixed-point addition, floating-point addition, fixed-point multiplication, floating-point multiplication, sum of two multiplications in a first floating-point precision, with or without casting to a second floating-point precision and the latter followed by a subsequent addition in the second floating-point precision, if desired, just to name a few. In some embodiments, two or more specialized processing blocks may be arranged in a cascade chain and perform together more complex operations such as a recursive mode dot product of two vectors of floating-point numbers having a first floating-point precision and output the dot product in a second floating-point precision.

20 Claims, 8 Drawing Sheets

(56) References Cited

U.S. PATENT DOCUMENTS

| | | |
|---|---|---|
| 8,051,123 B1 * | 11/2011 | Oberman ............... G06F 7/483 |
| | | 708/290 |
| 8,301,681 B1 | 10/2012 | Lee et al. |
| 9,164,728 B1 | 10/2015 | Langhammer |
| 9,207,908 B1 | 12/2015 | Langhammer |
| 2002/0002573 A1 | 1/2002 | Landers et al. |
| 2003/0154227 A1 | 8/2003 | Howard et al. |
| 2011/0137970 A1 | 6/2011 | Dockser et al. |

* cited by examiner

MIXED-PRECISION FLOATING-POINT ARITHMETIC CIRCUITRY IN SPECIALIZED PROCESSING BLOCKS

CROSS REFERENCE TO RELATED APPLICATION

This is a continuation of U.S. patent application Ser. No. 15/485,248 filed on Apr. 12, 2017, entitled "MIXED-PRECISION FLOATING-POINT ARITHMETIC CIRCUITRY IN SPECIALIZED PROCESSING BLOCKS," the entirety of which is hereby incorporated by reference for all purposes.

TECHNICAL FIELD

The present embodiments relate to integrated circuits and, more particularly, to mixed-precision floating-point arithmetic circuitry in specialized processing blocks in an integrated circuit.

BACKGROUND

As applications increase in complexity, it has become more common to include specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, adders, accumulators, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits and register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits often include specialized processing blocks. Each of those specialized processing blocks includes multipliers, adders, and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, they would be constructed outside the specialized processing block using general-purpose programmable logic of the device, or using a combination of the fixed-point operators inside the specialized processing block with additional logic in the general-purpose programmable logic.

DETAILED DESCRIPTION

Figure 1:
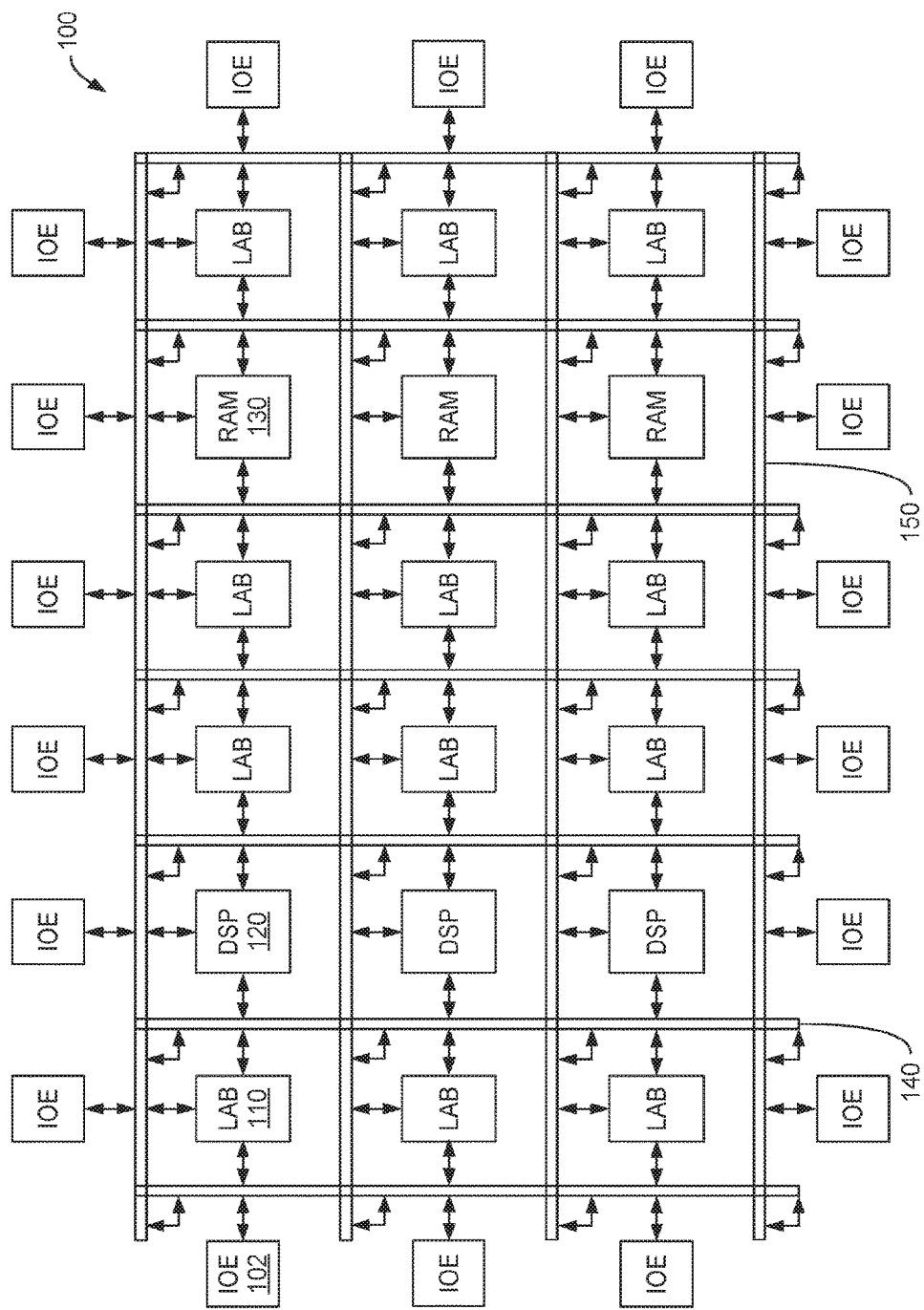
FIG. 1 shows a diagram of an illustrative integrated circuit such as a programmable integrated circuit in accordance with some embodiments.

The present embodiments provided herein relate to integrated circuits and, more particularly, to mixed-precision floating-point arithmetic circuitry in specialized processing blocks in an integrated circuit.

Floating-point numbers are commonplace for representing real numbers in scientific notation in computing systems and are designed to cover a large numeric range and diverse precision requirements. The IEEE 754 standard, ANSI/IEEE Std. 754-2008, published Aug. 29, 2008, is commonly used for floating-point numbers. A floating-point number includes three different parts: a sign, a mantissa sometimes also referred to as a significant, and an exponent. Each of these parts may be represented by a binary number and, in the format of the IEEE 754 standard, have different bit sizes depending on the precision. For example, a single-precision floating-point number may require 32 bits, which are distributed as follows: one sign bit (bit 31), eight exponent bits (bits [30:23]), and 23 mantissa bits (bits [22:0]). A double-precision floating-point number may require 64 bits including one sign bit (bit 63), 11 exponent bits (bits [62:52]), and 52 mantissa bits (bits [51:0]). A half-precision floating-point number may require 16 bits including one sign bit (bit 15), 5 exponent bits (bits [14:10]), and 10 mantissa bits (bits [9:0]).

According to the IEEE 754 standard, a mantissa may also have additional bits. A mantissa that has additional bits is sometimes also referred to as an extended mantissa. For example, an extended, single-precision mantissa may have five additional bits (i.e., an extended, single-precision mantissa may consist of 28 bits instead of 23 bits). The last three bits added to the right of the least significant bit (LSB) represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

Two bits may be added beyond the most significant bit (MSB) position, if desired, and may absorb any overflow produced by a floating-point arithmetic operation.

The sign of a floating-point number according to the IEEE 754 standard is represented using a single bit, where a zero denotes a positive number and a one denotes a negative number.

The exponent of a floating-point number preferably is an unsigned binary number which, for the single-precision format, ranges from 0 to 255. In order to represent a very small number, it is necessary to use negative exponents. Thus, the exponent preferably has a negative bias. For single-precision floating-point numbers, the bias preferably is −127. For example, a value of 140 for the exponent actually represents (140−127)=13, and a value of 100 represents (100−127)=−27. For double-precision and half-precision floating-point numbers, the exponent bias preferably is −1023 and −15, respectively.

As discussed above, according to the IEEE 754 standard, the mantissa is a normalized number (i.e., it has no leading zeros and represents the precision component of a floating-point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Specialized processing blocks that perform arithmetic operations often include a plurality of multipliers, adders, registers, and programmable connectors (e.g., multiplexers) that allow the various components of the specialized processing block to be configured in different ways. Typically, the arithmetic operators in such specialized processing blocks have been fixed-point operators.

If floating-point operators were needed, they would be constructed outside the specialized processing block (e.g., using additional logic in the integrated circuit, or using a combination of the fixed-point operators inside the specialized processing block with additional logic in the integrated circuit).

However, as applications increase in complexity, the use of floating-point operators has become more common. Furthermore, different applications may have different precision requirements. For example, some applications may require the use of double-precision floating-point arithmetic operators, while the use of half-precision floating-point arithmetic operators is sufficient for other applications. Consequently, it is desirable to provide a specialized processing block that is adaptable to efficiently implement floating-point operations with different precisions (e.g., according to the IEEE 754 standard, half-precision floating-point operations and/or single-precision floating-point operations and/or double-precision floating-point operations and/or quadruple-precision floating-point operations, and/or octuple-precision floating-point operations).

It will be recognized by one skilled in the art, that the present exemplary embodiments may be practiced without some or all of these specific details. In other instances, well-known operations have not been described in detail in order not to unnecessarily obscure the present embodiments.

FIG. 1 shows a diagram of an illustrative integrated circuit such as programmable integrated circuit 100 in accordance with some embodiments.

Programmable integrated circuit 100 may have input-output circuitry 102 for driving signals off of programmable integrated circuit 100 and for receiving signals from other devices. Input-output circuitry 102 may include conventional input-output circuitry, serial data transceiver circuitry, differential receiver and transmitter circuitry, or other circuitry used to connect one integrated circuit to another integrated circuit.

As shown, input-output circuitry 102 may be located around the periphery of programmable integrated circuit 100. If desired, programmable integrated circuit 100 may have input-output circuitry 102 arranged in different ways. For example, input-output circuitry 102 may form one or more columns of input-output circuitry that may be located anywhere on the programmable integrated circuit (e.g., distributed evenly across the width of the programmable integrated circuit). If desired, input-output circuitry 102 may form one or more rows of input-output elements (e.g., distributed across the height of the programmable integrated circuit). Alternatively, input-output circuitry 102 may form islands of input-output elements that may be distributed over the surface of the programmable integrated circuit or clustered in selected areas.

Vertical interconnection resources 140 and horizontal interconnection resources 150 such as global and local vertical and horizontal conductive lines and buses may be used to route signals on programmable integrated circuit 100. Vertical and horizontal interconnection resources 140 and 150 include conductive lines and programmable connections between respective conductive lines and are therefore sometimes referred to as programmable interconnects, configurable interconnections, or configurable interconnect circuitry.

Programmable logic regions may include programmable components such as digital signal processing circuitry 120 and storage circuitry 130 which both may be organized in specialized blocks, or other combinational and sequential logic circuitry organized in logic array blocks 110. The programmable logic regions may be configured to perform a custom logic function. If desired, the digital signal processing circuitry 120 and storage circuitry 130 may have limited configurability. In some embodiments, the programmable logic region may include additional specialized blocks such as programmable phase-locked loop circuitry, programmable delay-locked loop circuitry, or other specialized blocks with limited configurability.

In some embodiments, digital signal processing circuitry 120 may be adaptable to efficiently implement floating-point operations with different precisions. For example, digital signal processing circuitry 120 may implement half-precision floating-point operations and/or single-precision floating-point operations and/or double-precision floating-point operations and/or quadruple-precision floating-point operations, etc.

In some embodiments, multiple blocks of digital signal processing circuitry 120 may be arranged in a cascade chain and two or more blocks in the cascade chain of digital signal processing circuitry 120 may together implement a dot product of two vectors.

For example, each block of digital signal processing circuitry 120 may implement one or more multiplication operations, each generating a respective product by multiplying a tuple of one of the two vectors with a tuple of the other of the two vectors. If desired, a first block of digital signal processing circuitry 120 may generate a sum of the respective products generated by the first block and provide the sum at a cascade output, which is sometimes also referred to as a chain-out, a cascade output port, a chain output port, or a cascade chain output.

A second block of digital signal processing circuitry 120 may receive the sum from the first block via a cascade or chain connection at a cascade input, which is sometimes also referred to as a cascade-in, a cascade input port, a chain input port, or a cascade chain input.

The second block may generate a sum of the respective products generated by the second block and the sum received at the cascade input and provide the generated sum at a cascade output for further processing in an additional block of digital signal processing circuitry 120, if desired.

Programmable integrated circuit 100 may include programmable memory elements. These memory elements can be loaded with configuration data (sometimes also referred to as programming data) using input-output circuitry 102. Once loaded, the memory elements each provide a corresponding static control signal that controls the operation of an associated logic component in a programmable logic region. In a typical scenario, the outputs of the loaded memory elements are applied to the gates of transistors in the programmable logic region to turn certain transistors on or off and thereby configure the logic and the routing paths in the programmable logic region. Programmable logic circuit elements that may be controlled in this way include parts of multiplexers (e.g., multiplexers used for forming routing paths in programmable interconnects), look-up tables, logic arrays, XOR, AND, OR, NAND, and NOR logic gates, pass gates, inverters, etc.

Memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements are loaded with configuration data during programming, memory elements are sometimes referred to as configuration memory, configuration RAM, or programmable memory elements.

The circuitry of programmable integrated circuit 100 may be organized using any suitable architecture. As an example, the logic of programmable integrated circuit 100 may be organized in a series of rows and columns of larger programmable logic regions each of which contains multiple smaller logic regions.

The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs) or slices. Each region of logic may include a pair of adders, a pair of associated registers, shift registers, and one or more look-up tables or other block of shared combinational logic (i.e., resources from a pair of LEs—sometimes referred to as adaptive logic elements (ALEs) in this context). The larger regions may be, for example, logic array blocks (LABs) or configurable logic blocks (CLBs) containing multiple logic elements or multiple ALMs or multiple slices.

During device programming, configuration data is loaded into programmable integrated circuit 100 that configures the programmable logic regions so that their logic resources perform desired logic functions.

Figure 2:
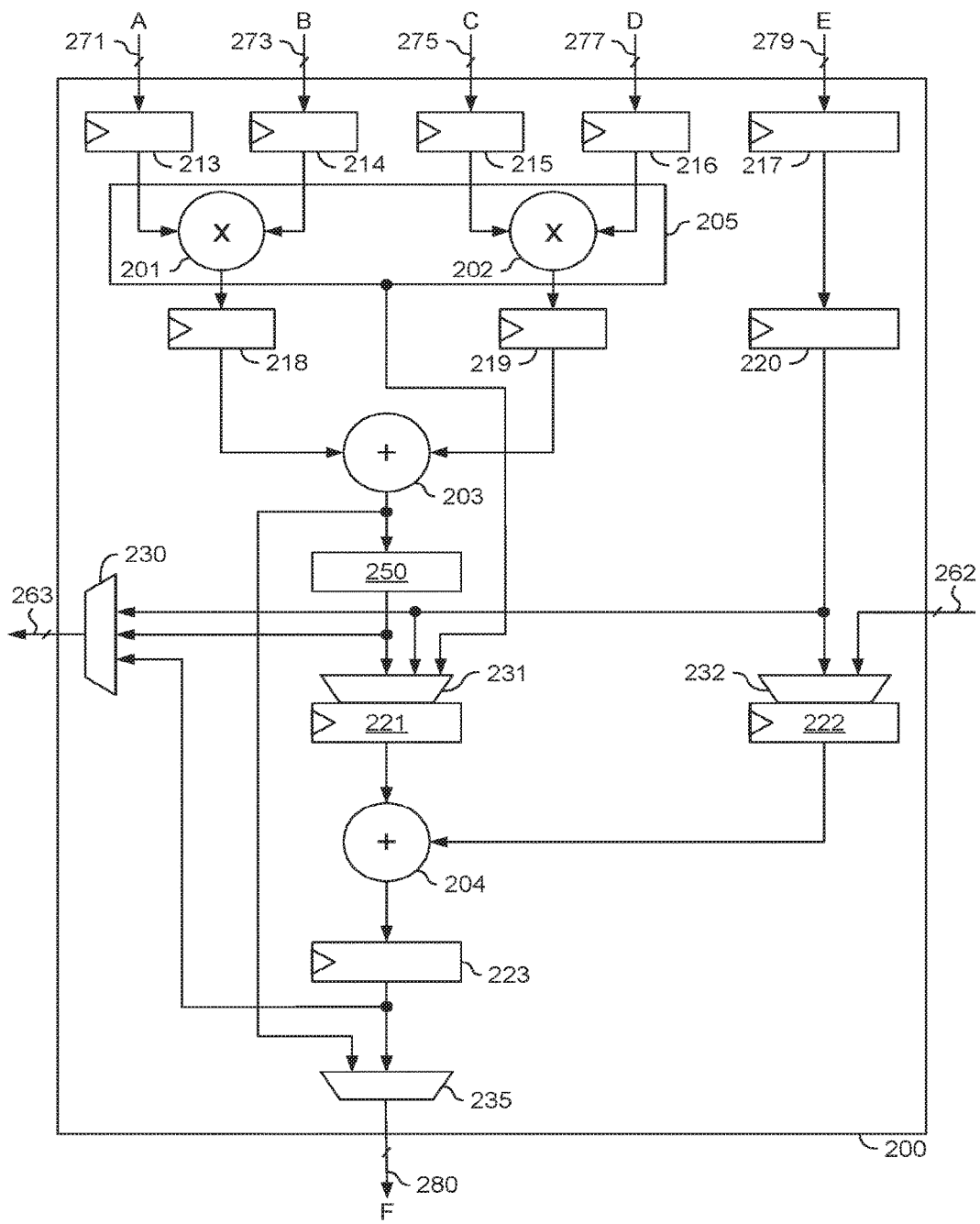
FIG. 2 is a diagram of an illustrative specialized processing block for performing mixed-precision floating-point operations in accordance with some embodiments.

An illustrative embodiment of a specialized processing block 200 that is adaptable to efficiently implement mixed-precision floating-point arithmetic operations is shown in FIG. 2. In this logical representation, implementation details, such as registers and some programmable routing features, such as multiplexers and routes that may allow the output of a particular structure to be routed around certain components or directly out of the specialized processing block, are omitted to simplify discussion. In addition, some elements that are shown may, in an actual embodiment, be implemented more than once. For example, multiplier 202 may actually represent two or more multipliers.

As shown, specialized processing block 200 may include input ports 271, 273, 275, 277, and 279, output port 280, chain-in port sometimes also referred to as cascade-in port or cascade input 262, chain-out port sometimes also referred to as cascade-out port or cascade output 263, multiplexers 230, 231, 232, and 235, multiplier stage 205, adder circuits 203 and 204, registers 213, 214, 215, 216, 217, 218, 219, 220, 221, 222, and 223, and cast function circuit 250. Multiplier stage 205 may include multiplier circuits 201 and 202.

Specialized processing block 200 may produce output signals at output port 280 and receive input signals at input ports 271, 273, 275, 277, and 279. If desired, specialized processing block 200 may be arranged in a cascade chain with other specialized processing blocks (e.g., in a row or a column) and receive additional input signals from an adjacent specialized processing block via a direct cascade connection at chain-in port 262 and provide additional output signals at chain-out port 263 via another direct cascade connection to another adjacent specialized processing block.

In some embodiments, adder circuit 203 and multiplier stage 205 with multiplier circuits 201 and 202 may operate on floating-point numbers of a first floating-point precision (e.g., according to the IEEE 754 standard, half-precision, single-precision, double-precision, quadruple-precision, or octuple-precision), and adder circuit 204 may operate on floating-point numbers of a second floating-point precision (e.g., according to the IEEE 754 standard, half-precision, single-precision, double-precision, quadruple-precision, or octuple-precision). If desired, the second floating-point precision may be different than the first floating-point precision.

As an example, the second floating-point precision may be a higher precision than the first floating-point precision. For example, according to the IEEE 754 standard, the second floating-point precision may be single-precision, double-precision, quadruple-precision, or octuple-precision if the first floating-point precision is half-precision; the second floating-point precision may be double-precision, quadruple-precision, or octuple-precision if the first floating-point precision is single-precision; the second floating-point precision may be quadruple-precision or octuple-precision if the first floating-point precision is double-precision, or the second floating-point precision may be octuple-precision if the first floating-point precision is quadruple-precision.

As another example, the second floating-point precision may be a lower precision than the first floating-point precision. For example, according to the IEEE 754 standard, the second floating-point precision may be half-precision, single-precision, double-precision, or quadruple-precision if the first floating-point precision is octuple-precision; the second floating-point precision may be half-precision, single-precision, or double-precision if the first floating-point precision is quadruple-precision; the second floating-point precision may be half-precision or single-precision if the first floating-point precision is double-precision; or the second floating-point precision may be half-precision if the first floating-point precision is single-precision).

In some embodiments, cast function circuit 250 may convert the output of adder circuit 203 from the first floating-point precision into the second floating-point precision. For example, the output of adder circuit 203 may be a half-precision floating-point number and cast function circuit may convert the sum of products to a single-precision floating-point number. As another example, the output of adder circuit 203 may a double-precision floating-point number and cast function circuit 250 may convert the sum of products to a single-precision floating-point number.

To convert a floating-number from a first floating-point precision to a second floating-point precision that is higher than the first floating-point precision, which is sometimes also referred to as an up conversion, cast function circuit 250 may increase the number of bits of the mantissa and the number of bits of the exponent and adjust the bias of the exponent accordingly. For example, to convert a half-precision floating-point number to a single-precision floating-point number, cast function circuit 250 may increase the size of the mantissa from 10 bits to 23 bits (e.g., by adding 13 zeros to the right of the least significant bit (LSB) position) and the size of the exponent from 5 bits to 8 bits (e.g., by adding 3 zeros to the left of the most significant bit (MSB) position). Cast function circuit 250 may adjust the bias of the exponent by adding 112 to the half-precision floating-point exponent.

To convert a floating-point number from a first floating-point precision to a second floating-point precision that is lower than the first floating-point precision, which is sometimes also referred to as a down conversion, cast function circuit 250 may decrease the number of bits of the mantissa (e.g., through rounding), adjust the bias of the exponent accordingly, and decrease the number of bits of the exponent.

If desired, cast function circuit 250 may include conversion of special cases (e.g., the first floating-point precision number may be denormalized, zero, infinity, or not a number (NaN)). As an example, a denormalized first floating-point precision number may be converted into a zero, which is sometimes also referred to as denormals-are-zero (DAZ). As another example, in down conversion, zero, a denormal, or too big of an exponent underflow may be converted to zero, and infinity or an exponent overflow may be converted to infinity.

Configurable interconnect circuitry in specialized processing block 200 may route signals between input ports 271, 273, 275, 277, and 279, output port 280, chain-in port 262, chain-out port 263, multiplier circuits 201 and 202, adder circuits 203 and 204, registers 213, 214, 215, 216, 217, 218, 219, 220, 221, 222, and 223, and cast function circuit 250.

As shown, configurable interconnect circuitry may include multiplexers 230, 231, 232, and 235, and interconnections, which are sometimes also referred to as routing tracks. The configurable interconnect circuitry may be used to bypass some of the components of specialized processing block 200. For example, multiplexer 231 may select between the output of cast function circuit 250 and the output of the multiplier stage 205, thereby bypassing registers 218 and 219 and adder circuit 203. Similarly, multiplexer 235 may select between the output of register 223 and the output of adder circuit 203, thereby enabling a bypass path that bypasses cast function circuit 250, multiplexer 231, register 221, adder circuit 204, and register 223.

If desired, the configurable interconnect circuitry may include additional multiplexers to increase the flexibility of connecting the different components of specialized processing block 200 and allow for additional bypass paths. For example, additional multiplexers in front of registers 218 and 219 may enable a bypass path around multiplier stage 205, additional multiplexers behind a register (e.g., register 218, 219, 220, etc.) may enable a bypass path around the respective register, etc.

Control signals may control the selection performed by multiplexers 230, 231, 232, and 235. The control signals may be generated by logic circuits that dynamically control the selection of the respective multiplexers and/or stored in storage circuits. The logic circuits and/or storage circuits may be located inside specialized processing block 200. If desired, some or all of the logic circuits and/or storage circuits may be located outside of specialized processing block 200 and the control signals may be provided to the respective multiplexers through additional input ports.

The control signals may be stored individually for each multiplexer or in groups for multiple multiplexers. The storage circuits may load the control signals during configuration or reconfiguration of specialized processing block 200. In some embodiments, the storage circuits may be programmable memory elements of an integrated circuit (e.g., programmable integrated circuit 100 of FIG. 1).

Multiplexer 230 may select between routing outputs of cast function circuit 250 and registers 220 and 223 to cascade output 263. Multiplexer 231 may select between routing outputs of multiplier stage 205, cast function circuit 250, and register 220 to register 221. Multiplexer 232 may select between routing the output of register 220 and a signal from cascade input 262 to register 222. Multiplexer 235 may select between routing the outputs of cast function circuit 250 and register 223 to output port 280.

In the logical representation of FIG. 2, specialized processing block 200 may implement a fixed-point addition, a floating-point addition, a fixed-point multiplication, a floating-point multiplication, a sum of two multiplications in a first floating-point precision, with or without casting to a second floating-point precision and the latter followed by a subsequent addition in the second floating-point precision, if desired, etc.

Consider the scenario in which specialized processing block 200 receives input signals A, B, C, D, and E at input ports 271, 273, 275, 277, and 279, respectively, and chain-in signal CHAIN_IN at cascade input 262. Consider further that input signals A, B, C, and D are signals encoding floating-point numbers of a first floating-point precision (e.g., half-precision, single-precision, double-precision, or quadruple-precision, according to the IEEE 754 standard) and input signal E and chain-in signal CHAIN_IN signals encoding floating-point numbers of a second floating-point precision that is a higher precision than the first floating-point precision (e.g., single-precision if the first floating-point precision is half-precision, double-precision if the first floating-point precision is single-precision, quadruple-precision if the first floating-point precision is double-precision, or octuple-precision if the first floating-point precision is quadruple-precision, according to the IEEE 754 standard).

In this scenario, multiplier stage 205 may compute the product of A and B (i.e., A*B) in multiplier circuit 201 and the product of C and D (i.e., C*D) in multiplier circuit 202. The products may be stored in registers 218 and 219, respectively, if desired. Adder circuit 203 may generate the sum of the products (i.e., A*B+C*D).

In some embodiments, cast function circuit 250 may convert the sum of products from the first floating-point precision to the second floating-point precision. For example, the sum of products may be a half-precision floating-point number and cast function circuit may convert the sum of products to a single-precision floating-point number. As another example, the sum of products may be a double-precision floating-point number and cast function circuit 250 may convert the sum of products to a single-precision floating-point number.

Configurable interconnect circuitry may select the output of cast function circuit 250 in multiplexer 231 and the CHAIN_IN signal at cascade input 262 in multiplexer 232, thereby routing the converted sum of products from the output of cast function circuit 250 to adder circuit 204 and the CHAIN_IN signal from cascade input 262 to adder circuit 204.

If desired, adder circuit 204 may add the sum of products to the CHAIN_IN signal to generate another sum signal. Multiplexer 235 of the configurable interconnect circuitry may select between the sum of products from adder circuit 203 and the other sum signal from adder circuit 204. The configurable interconnect circuitry may route the sum of products to output 280 by selecting the output of adder circuit 203 in multiplexer 235. Alternatively, the configurable interconnect circuitry may route the other sum to output 280 by selecting the output of adder circuit 204 in multiplexer 235.

In certain embodiments, specialized processing block 200 may implement additional features. For example, specialized processing block 200 may include a path from the output of register 223 to an additional input of multiplexer 231 or to an additional input of multiplexer 232, thereby enabling the implementation of an accumulation operation, if desired.

Based on the configuration of the configurable interconnect circuitry, specialized processing block 200 may implement different arithmetic operations as described above.

Figure 3:
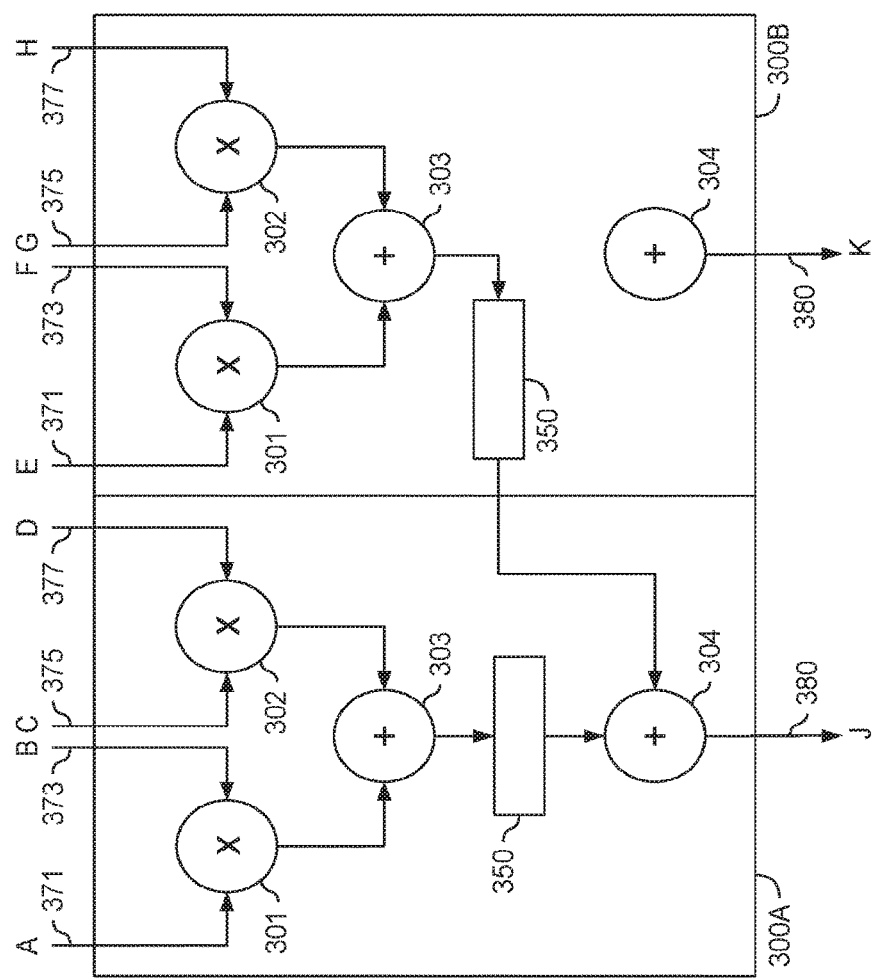
FIG. 3 is a diagram of two illustrative specialized processing blocks that are arranged in a cascade chain and perform together a first stage of a recursive mode dot product operation in accordance with some embodiments.

FIG. 3 is a diagram of two illustrative specialized processing blocks 300A and 300B that are arranged in a cascade chain and perform together a first stage of a recursive mode dot product operation in accordance with some embodiments.

If desired, specialized processing block 200 of FIG. 2 may implement each of specialized processing blocks 300A and 300B. In the logical representation of FIG. 3, details of the implementation of specialized processing blocks 300A and 300B, such as registers and some programmable routing features such as multiplexer are omitted to simplify discussion.

As shown, specialized processing blocks 300A and 300B may both include inputs 371, 373, 375, and 377, output 380, cast function circuit 350, multiplier circuits 301 and 302, and adder circuits 303 and 304. A cascade connection may couple a cascade output of specialized processing block 300B to a cascade input of specialized processing block 300A.

In some embodiments, multiplier circuits 301 and 302 and adder circuit 303 may operate on floating-point numbers of a first floating-point precision, adder circuit 304 may operate on floating-point numbers of a second floating-point precision, and cast function circuit 350, which may operate in a similar way as cast function circuit 250 of FIG. 2, may be coupled to the output of adder circuit 303 to convert the output of adder circuit 303 from the first floating-point precision to the second floating-point precision.

Consider the scenario in which specialized processing blocks 300A and 300B generate together a dot product of a first vector Y with tuples A, C, E, and G (i.e., Y=(A,C,E,G)^T) and a second vector Z with tuples B, D, F, and H (i.e., Z=(B,D,F,H)^T). Consider further that the tuples of vectors Y and Z have a first floating-point precision (e.g., according to the IEEE standard 754, half precision, single precision, double precision, or quadruple precision).

In this scenario, specialized processing block 300A may receive two tuples from each of vectors Y and Z (e.g., tuples A and C from vector Y and tuples B and D from vector Z) and specialized processing block 300B the other two tuples from each of vectors Y and Z (e.g., tuples E and G from vector Y and tuples F and H from vector Z) at inputs 371, 375, 373, and 377, respectively.

Multiplier circuits 301 and 302, adder circuit 303, and cast function circuit 350 of specialized processing block 300B may generate a first partial result having a second floating-point precision, that has a higher precision than the first floating-point precision (e.g., according to IEEE standard 754, single precision, double precision, quadruple precision, octuple precision), based on a first quaternary reduction of the tuples of vectors Y and Z received at inputs 371, 373, 375, and 377. For example, in specialized processing block 300B, multiplier circuit 301 may generate the product E*F, multiplier circuit 302 the product G*H, and adder circuit 303 the sum of products E*F+G*H. Cast function circuit 350 in specialized processing block 300B may convert the sum of products E*F+G*H from the first floating-point precision to the second floating-point precision as outlined above, thereby generating the first partial result.

Similarly, multiplier circuits 301 and 302, adder circuit 303, and cast function circuit 350 of specialized processing block 300A may generate a second partial result having the second floating-point precision based on a second quaternary reduction of the tuples of vectors Y and Z received at inputs 371, 373, 375, and 377. For example, in specialized processing block 300A, multiplier circuit 301 may generate the product A*B, multiplier circuit 302 the product C*D, and adder circuit 303 the sum of products A*B+C*D. Cast function circuit 350 in specialized processing block 300A may convert the sum of products A*B+C*D from the first floating-point precision to the second floating-point precision as outlined above, thereby generating the second partial result.

Configurable interconnection circuitry in specialized processing blocks 300A and 300B may route the first partial result from cast function circuit 350 in specialized processing block 300B via the cascade connection to adder circuit 304 in second specialized processing block 300A and the second partial result from cast function circuit 350 to adder circuit 304 in specialized processing block 300A.

Adder circuit 304 of specialized processing block 300A may generate the dot product of vectors Y and Z (i.e., Y*Z=A*B+C*D+E*F+G*H) by performing a binary reduction (i.e., an addition) of the first and second partial results and provide the dot product as signal J at output 380 of specialized processing block 300A.

Figure 4:
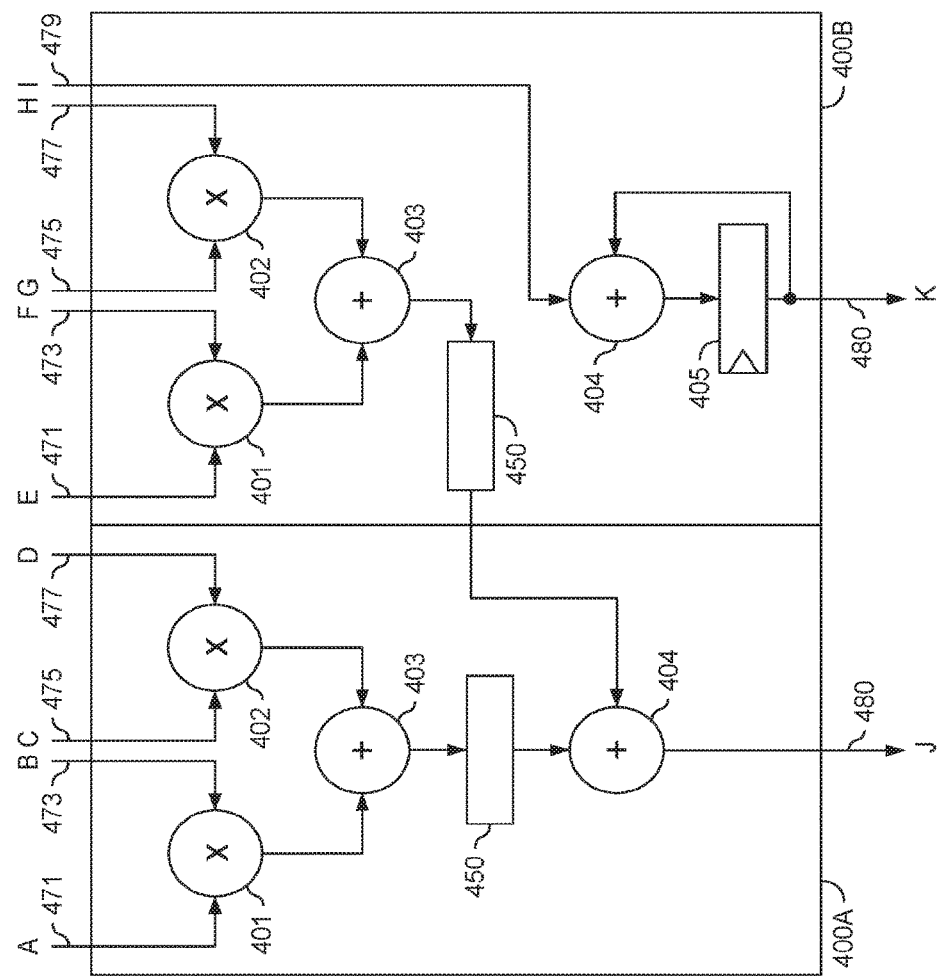
FIG. 4 is a diagram of two illustrative specialized processing blocks that are arranged in a cascade chain and perform together a first stage of a recursive mode dot product operation and an accumulation operation in accordance with some embodiments.

FIG. 4 is a diagram of two illustrative specialized processing blocks that are arranged in a cascade chain and perform together a first stage of a recursive mode dot product operation and an accumulation operation in accordance with some embodiments.

If desired, specialized processing block 200 of FIG. 2 may implement each of specialized processing blocks 400A and 400B. In the logical representation of FIG. 4, details of the implementation of specialized processing blocks 400A and 400B, such as registers and some programmable routing features such as multiplexer are omitted to simplify discussion.

As shown, specialized processing blocks 400A and 400B may both include inputs 471, 473, 475, and 477, output 480, cast function circuit 450, multiplier circuits 401 and 402, and adder circuits 403 and 404. Specialized processing block 400B may further include input 479 and register 405 that is coupled between the output of adder circuit 404 and output 480 and an input of adder circuit 404. A cascade connection may couple a cascade output of specialized processing block 400B to a cascade input of specialized processing block 400A.

Specialized processing blocks 400A and 400B may together implement the dot product of vectors Y and Z described in FIG. 3. If desired, specialized processing block 400B may in addition implement an accumulation operation of signal I received at input 479. For example, signal I may encode a floating-point number of a different floating-point precision than signals A, B, C, D, E, F, G, or H. Adder circuit 404 of specialized processing block 400B may add the signal stored in register 405 (e.g., zero at reset) to the signal received at input 479. Register 405 may store the sum generated by adder circuit 404 and adder circuit 404 may add the stored sum to the signal received at input 479, thereby implementing an accumulation operation.

Figure 5:
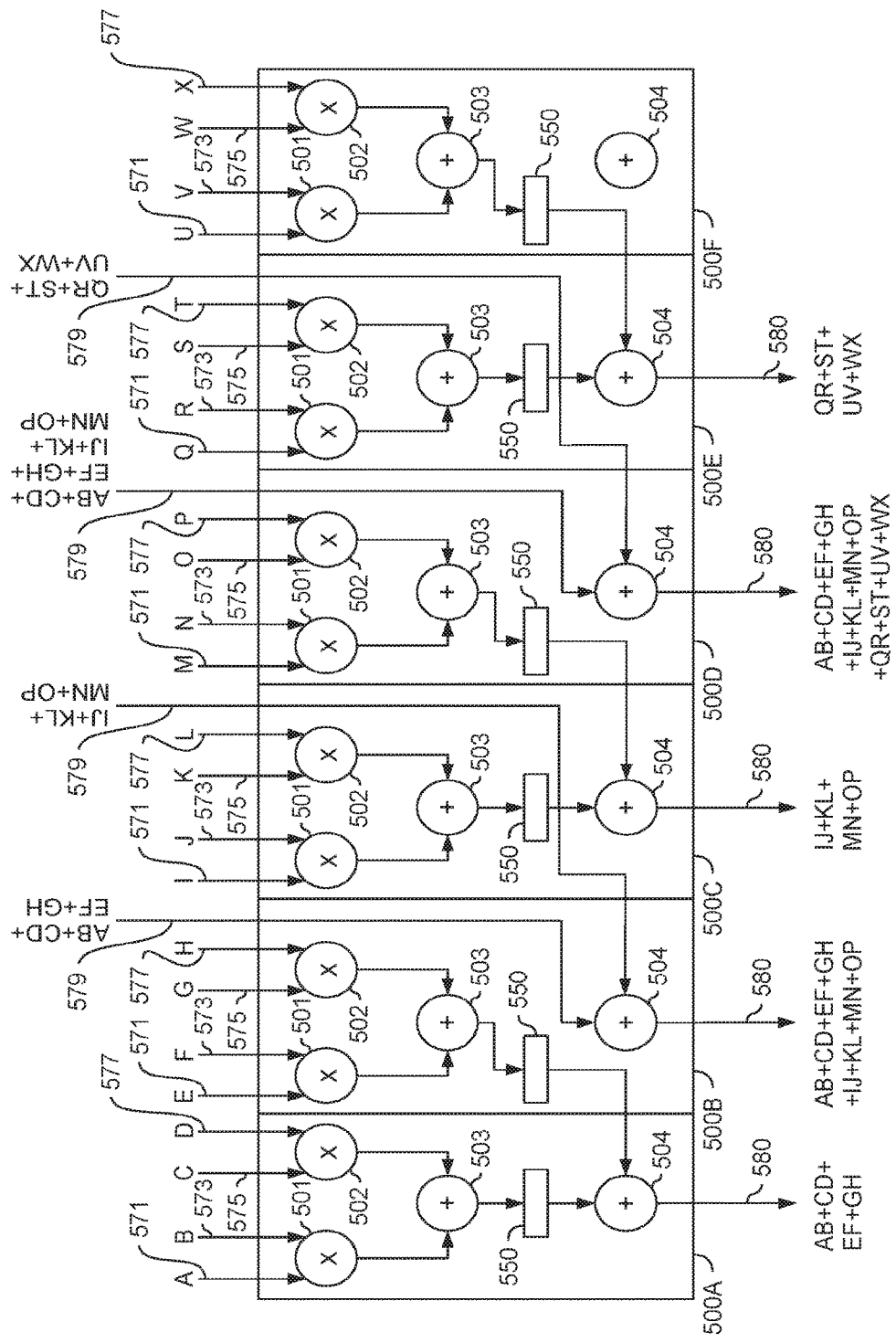
FIG. 5 is a diagram of six illustrative specialized processing blocks that are arranged in a cascade chain and generate a dot product of two vectors of floating-point numbers in accordance with some embodiments.

Using the two specialized processing blocks 300A and 300B of FIG. 3 as building blocks of neighboring specialized processing blocks, a recursive tree for generating a dot product of two vectors may be constructed. FIG. 5 is a diagram of six illustrative specialized processing blocks that are arranged in a cascade chain and generate a dot product of two vectors of floating-point numbers in accordance with some embodiments.

If desired, specialized processing block 200 of FIG. 2 may implement each of specialized processing blocks 500A, 500B, 500C, 500D, 500E, and 500F. In the logical representation of FIG. 5, details of the implementation of specialized processing blocks 500A, 500B, 500C, 500D, 500E, and 500F, such as registers and some programmable routing features such as multiplexer are omitted to simplify discussion.

As shown, specialized processing blocks 500A-500F (i.e., 500A, 500B, 500C, 500D, 500E, and 500F) may each include inputs 571, 573, 575, and 577, output 580, cast function circuit 550, multiplier circuits 501 and 502, and adder circuits 503 and 504. Specialized processing blocks 500B, 500C, 500D, and 500E may further include input 579. A cascade connection may couple a cascade output of specialized processing block 500F, 500E, 500D, 500C, and 500B to a cascade input of specialized processing block 500E, 500D, 500C, 500B, and 500A, respectively.

Consider the scenario in which specialized processing blocks 500A-500F together implement the dot product of vector Y with tuples A, C, E, G, I, K, M, O, Q, S, U, W (i.e., Y=(A,C,E,G,I,K,M,O,Q,S,U,W)^T) and vector Z with tuples B, D, F, H, J, L, N, P, R, T, V, and X (i.e., Z=(B,D,F,H,J,L,N,P,R,T,V,X)^T). Consider further that the tuples of vectors Y and Z have a first floating-point precision (e.g., according to IEEE standard 754, half precision, single precision, double precision, or quadruple precision).

In this scenario, specialized processing block 500A may receive two tuples from each of vectors Y and Z (e.g., tuples A and C from vector Y and tuples B and D from vector Z) at inputs 571, 573, 575, and 577, respectively. Similarly, specialized processing blocks 500B-500F may each receive two tuples from each of vectors Y and Z (e.g., 500B receives tuples E and G from vector Y and tuples F and H from vector Z, 500C receives I, J, K, and L, 500D receives M, N, O, P, 500E receives Q, R, S, T, and 500F receives U, V, W, and X) at inputs 571, 573, 575, and 577, respectively.

Each pair of specialized processing blocks may implement the first stage of a recursive mode dot product operation as shown in FIG. 3 by generating a partial result based on a quaternary reduction of the tuples of vectors Y and Z received at inputs 571, 573, 575, and 577 using multiplier circuits 501 and 502, adder circuit 503, and cast function circuit 550, followed by a binary reduction of the partial result generated in the current specialized processing block and the partial result generated in a neighboring specialized processing block.

For example, multiplier circuits 501 and 502, adder circuit 503, and cast function circuit 550 of specialized processing block 500B may generate the sum of products E*F+G*H converted from the first floating-point precision to a second floating-point precision that has a higher floating-point precision as outlined above, thereby generating one partial result. Similarly, multiplier circuits 501 and 502, adder circuit 503, and cast function circuit 550 of specialized processing block 500A may generate the sum of products A*B+C*D converted from the first floating-point precision to the second floating-point precision, thereby generating another partial result.

Configurable interconnection circuitry in specialized processing blocks 500A and 500B may route the two partial results to adder circuit 504 in specialized processing block 500A.

Adder circuit 504 of specialized processing block 500A may generate the first stage result of the dot product of vectors Y and Z (i.e., A*B+C*D+E*F+G*H) by performing a binary reduction (i.e., an addition) of the two partial results (i.e., A*B+C*D and E*F+G*H) and provide the first stage result of the dot product at output 580 of specialized processing block 500. Similarly, specialized processing blocks 500C and 500D may generate first stage result I*J+K*L+M*N+O*P and specialized processing blocks 500E and 500F first stage result Q*R+S*T+U*V+W*X.

Using the building blocks of neighboring specialized processing blocks (i.e., 500A and 500B, 500C and 500D, and 500E and 500F), a recursive tree may be constructed. For example, the first stage results of the dot product of vectors Y and Z (i.e., the outputs of specialized processing blocks 500A, 500C, and 500E) may be routed via routing resources that are external to specialized processing blocks 500A-500F (e.g., using vertical interconnection resources 140 and horizontal interconnection resources 150 of programmable integrated circuit 100 of FIG. 1) to inputs 579 of specialized processing blocks 500B, 500C, and 500E, respectively.

As shown, configurable interconnection circuitry in specialized processing blocks 500B and 500C may route the first stage result I*J+K*L+M*N+O*P from input 579 of specialized processing block 500C via a cascade connection to adder circuit 504 of specialized processing block 500B and the first stage result A*B+C*D+E*F+G*H from input 579 to adder circuit 504 of specialized processing block 500B. Specialized processing block 500B may use adder

504 to generate the second stage result (i.e., A*B+C*D+ E*F+G*H+I*J+K*L+M*N+O*P) and provide the second stage result at output 580.

The second stage result may be routed via routing resources that are external to specialized processing blocks 500A-500F to input 579 of specialized processing blocks 500D and from there to adder 504 of specialized processing block 500D. Configurable interconnection circuitry in specialized processing blocks 500D and 500D may route the first stage result Q*R+S*T+U*V+W*X from input 579 of specialized processing block 500E via a cascade connection to adder circuit 504 of specialized processing block 500D. Specialized processing block 500D may use adder 504 to generate the final dot product result (i.e., A*B+C*D+E*F+ G*H+I*J+K*L+M*N+O*P+Q*R+S*T+U*V+W*X) in a third stage and provide the final dot product at output 580.

If desired, register pipelining may be performed at any level of the recursive tree described in FIG. 5 (e.g., to simplify routing and/or to improve speed). As the subsequent stage adders after the first stage (i.e., adders 504 of specialized processing blocks 500B and 500D) are completely independent of the first stage adders (and each other) the subsequent stage adders may be placed in any of the specialized processing blocks 500B, 500D, or 500F in which adder 504 is unused in the first stage of the dot product computation. This may be useful, for example, in later stages, where there may be longer lengths from stage to stage.

Adder circuit 504 of specialized processing block 500F may be omitted since a dot product of two vectors with N-tuples in each vector requires N multiplier circuits and (N−1) adder circuits. Alternatively, the N-th adder circuit 504 may be used independently for other purposes.

Figure 6:
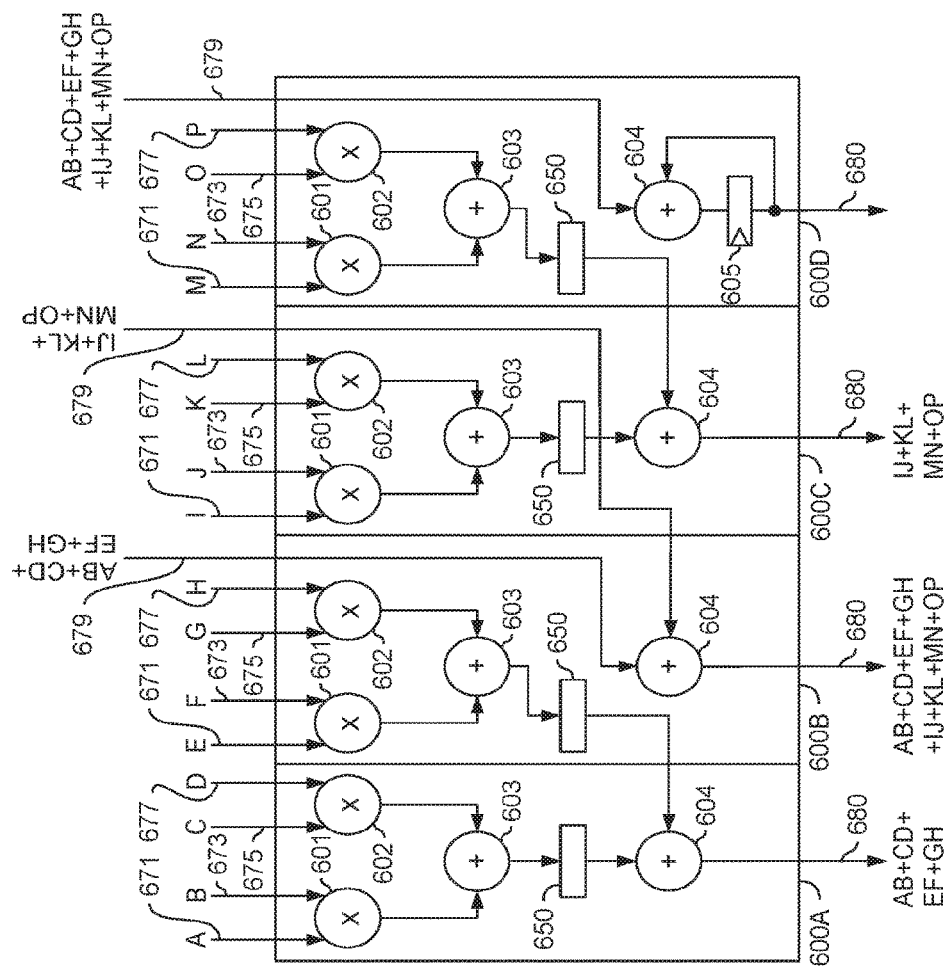
FIG. 6 is a diagram of four illustrative specialized processing blocks that are arranged in a cascade chain and perform a recursive mode dot product of two vectors of floating-point numbers and an accumulation of the result in accordance with some embodiments.

FIG. 6 is a diagram of four illustrative specialized processing blocks 600A-600D (i.e., 600A, 600B, 600C, and 600D) that are arranged in a cascade chain and perform a recursive mode dot product of two vectors of floating-point numbers and an accumulation of the result in accordance with some embodiments.

If desired, specialized processing block 200 of FIG. 2 may implement each of specialized processing blocks 600A-600D. In the logical representation of FIG. 6, details of the implementation of specialized processing blocks 600A-600D, such as registers and some programmable routing features such as multiplexer are omitted to simplify discussion.

As shown, specialized processing blocks 600A-600D may each include inputs 671, 673, 675, and 677, output 680, cast function circuit 650, multiplier circuits 601 and 602, and adder circuits 603 and 604. Specialized processing blocks 600B, 600C, and 600D may further include input 679, and specialized processing block 600D may include register 605 that may implement an accumulator with adder circuit 604. A cascade connection may couple a cascade output of specialized processing block 600D, 600C, and 600B to a cascade input of specialized processing block 600C, 600B, and 600A, respectively.

As an example, specialized processing blocks 600A-600D may implement the first two stages of the recursive dot product generation shown in FIG. 5. In other words, specialized processing blocks 600A-600D may generate the dot product Y*Z=A*B+C*D+E*F+G*H+I*J+K*L+M*N+O*P of vector Y with tuples A, C, E, G, I, K, M, and O (i.e., Y=(A,C,E,G,I,K,M,O)^T) and vector Z with tuples B, D, F, H, J, L, N, and P (i.e., Z=(B,D,F,H,J,L,N,P)^T) and provide the dot product at output 680 of specialized processing block 600B.

If desired, the dot product may be routed via routing resources that are external to specialized processing blocks 600A-600D to input 679 of specialized processing blocks 600D and from there to adder 604 of specialized processing block 600D. Adder circuit 604 of specialized processing block 600D may add the signal stored in register 605 (e.g., zero at reset) to the signal received at input 679. Register 605 may store the sum generated by adder circuit 604 and adder circuit 604 may add the stored sum to the signal received at input 679, thereby implementing an accumulation operation of the dot product.

Figure 7:
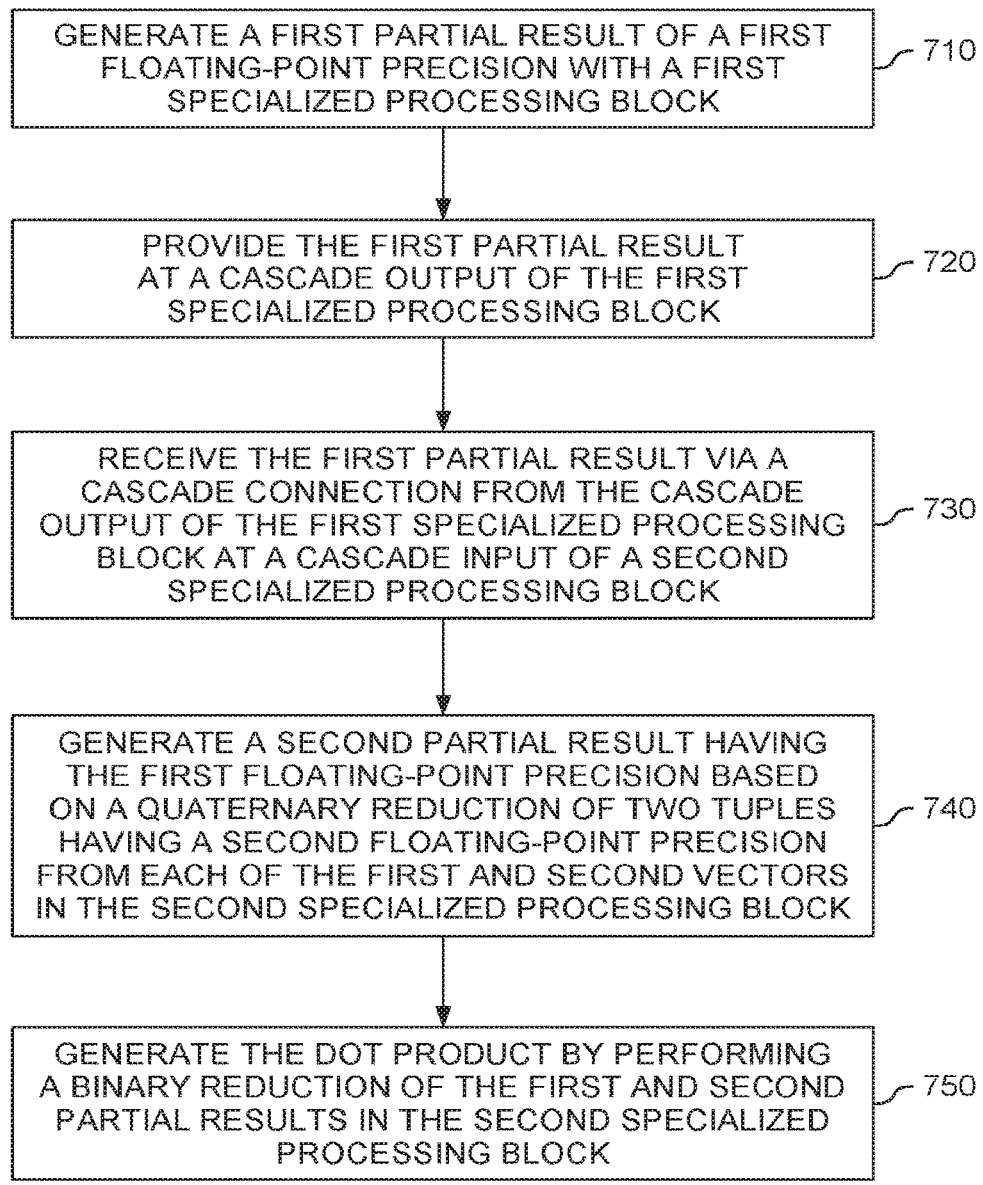
FIG. 7 is a diagram of a flow chart showing illustrative operations for operating an integrated circuit that generates a dot product of first and second vectors in accordance with some embodiments.

FIG. 7 is a diagram of a flow chart showing illustrative operations for operating an integrated circuit that generates a dot product of first and second vectors in accordance with some embodiments.

During operation 710, the integrated circuit may generate a first partial result of a first floating-point precision with a first specialized processing block. As an example, an integrated circuit such as programmable integrated circuit 100 of FIG. 1 may include specialized processing blocks 300A and 300B of FIG. 3; and specialized processing block 300B may generate the sum of products E*F+G*H as a first partial result having a first floating-point precision (e.g., a single-precision floating-point number format).

During operation 720, the integrated circuit may provide the first partial result at a cascade output of the first specialized processing block. For example, specialized processing block 300B of FIG. 3 may provide the first partial result (i.e., the sum of products E*F+G*H) at the cascade output.

During operation 730, the integrated circuit may receive the first partial result via a cascade connection from the cascade output of the first specialized processing block at a cascade input of a second specialized processing block. For example, specialized processing block 300A of FIG. 3 may receive the sum of products E*F+G*H via the cascade connection at the cascade input from specialized processing block 300B.

During operation 740, the integrated circuit may generate a second partial result having the first floating-point precision based on a quaternary reduction of two tuples having a second floating-point precision from each of the first and second vectors in the second specialized processing block. For example, specialized processing block 300A of FIG. 3 may receive tuples A and C from a vector Y and tuples B and D from a vector Z. If desired, tuples A, B, C, and D may have a second floating-point precision (e.g., a half-precision floating-point number format). Specialized processing block 300A may use multiplier circuits 301 and 302 and adder circuit 303 followed by a conversion to the first floating-point precision in cast function circuit 350 to generate the sum of products A*B+C*D as a second partial result having the first floating-point precision (e.g., a single-precision floating-point number format).

During operation 750, the integrated circuit may generate the dot product by performing a binary reduction of the first and second partial results in the second specialized processing block. For example, adder circuit 304 in specialized processing block 300A of FIG. 3 may generate the dot product by adding the first partial product (i.e., E*F+G*H) to the first partial product (i.e., A*B+C*D), thereby generating the dot product of vector Y with tuples A, C, E, and G and vector Z with tuples B, D, F, and H.

A machine-readable medium may encode instructions for carrying out a method (e.g., instructions for configuring an integrated circuit to generate a dot product of first and second vectors as described by the method of FIG. 7) on an integrated circuit in accordance with some embodiments. A suitable computer or similar device may execute these instructions, thereby implementing the method in the integrated circuit. For example, a personal computer may be equipped with an interface to which the integrated circuit may be connected, and suitable software tools and/or a user, with the help of the personal computer, may program the method into the integrated circuit through the interface.

In some embodiments, the instructions for carrying out the method may be generated by other instructions that are encoded on the same or an additional machine-readable medium. In other words, a first set of instructions (e.g., a C-language compiler or an electronic design automation (EDA) tool) executed on a computer or similar device may generate a second set of instructions (e.g., assembler code or a series of bits for programming configurable circuitry), whereby the second set of instructions includes the method that is executed on an integrated circuit (e.g., a microprocessor or a programmable integrated circuit device such as programmable integrated circuit 100 of FIG. 1).

A machine-readable medium may include any type of device or technology that allows for the storage of instructions including semiconductor memory which may be volatile (e.g., dynamic random-access memory (DRAM), static random-access memory (SRAM), etc.) or non-volatile (e.g., programmable read-only memory (PROM), flash memory, etc.), magnetic storage devices, optical storage devices, or a combination thereof.

Figure 8:
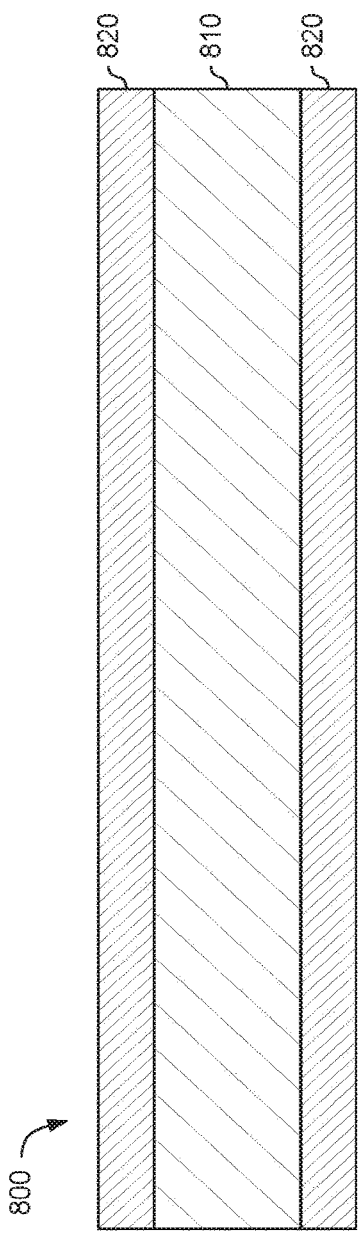
FIG. 8 is a cross-sectional view of a magnetic data storage medium encoded with a set of machine-executable instructions for configuring an integrated circuit to generate a dot product of first and second vectors in accordance with some embodiments.

FIG. 8 presents a cross section of a magnetic data storage medium 800 which may be encoded with a machine executable program that can be carried out by systems such as the aforementioned personal computer, or other computer or similar device. Medium 800 may be a floppy diskette or hard disk, or magnetic tape, having a suitable substrate 810, which may be conventional, and a suitable coating 820, which may be conventional, on one or both sides, containing magnetic domains whose polarity or orientation may be altered magnetically. Except in the case where it is magnetic tape, medium 800 may also have an opening for receiving the spindle of a disk drive or other data storage device.

The magnetic domains of coating 820 of medium 800 may be polarized or oriented so as to encode, in manner which may be conventional, a machine-executable program, for execution by a programming system such as a personal computer or other computer or similar system, having a socket or peripheral attachment into which the integrated circuit to be configured may be inserted for the purpose of configuring appropriate portions of the integrated circuit, including its specialized processing blocks, if any, in accordance with some embodiments.

Figure 9:
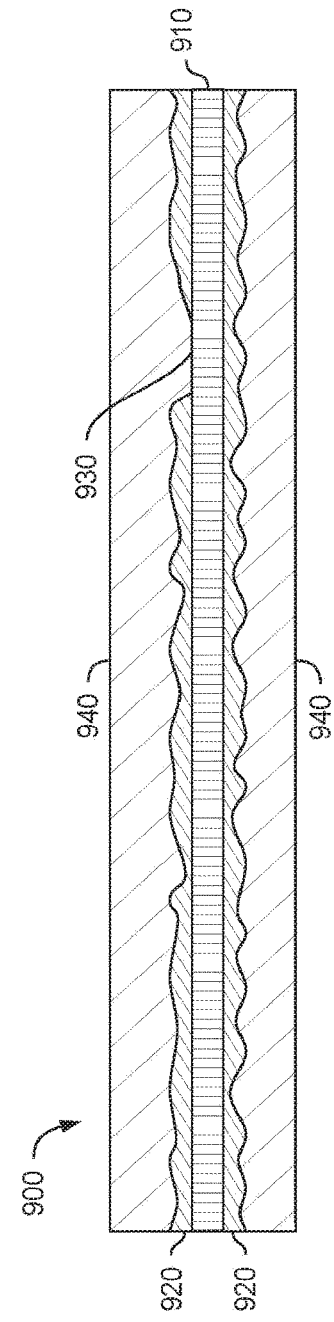
FIG. 9 is a cross-sectional view of an optically readable data storage medium encoded with a set of machine executable instructions for configuring an integrated circuit to generate a dot product of first and second vectors in accordance with some embodiments.

FIG. 9 shows a cross section of an optically-readable data storage medium 900 which may be encoded with an aforementioned machine-executable program, to be carried out by systems such as the aforementioned personal computer, or other computer or similar device. Medium 900 may be a Blu-ray disc (BD), a conventional compact disk (CD) read-only memory (ROM) or a digital versatile disk (DVD, sometimes also referred to as digital video disk) read-only memory (ROM), or any rewriteable medium such as a CD R, CD RW, DVD R, DVD RW, DVD+R, DVD+RW, or DVD-RAM or a magneto-optical disk which is optically readable and magneto-optically rewriteable. Medium 900 may have a suitable substrate 910 and a suitable coating 920 usually on one or both sides of substrate 910.

In the case of a CD-based or DVD-based medium, as is well known, coating 920 is reflective and is impressed with a plurality of pits 930, arranged on one or more layers, to encode the machine-executable program. The arrangement of pits is read by reflecting laser light off the surface of coating 920. A protective coating 940 may be provided on top of coating 920.

In the case of magneto-optical disk, as is well known, coating 920 has no pits 930, but has a plurality of magnetic domains whose polarity or orientation may be changed magnetically when heated above a certain temperature, for example by a laser. The orientation of the domains may be read by measuring the polarization of laser light reflected from coating 920. The arrangement of the domains may encode the program as described above.

The method and apparatus described herein may be incorporated into any suitable circuit or system of circuits. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using circuitry that efficiently performs mixed-precision floating-point arithmetic operations is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination.

The following examples pertain to further embodiments.

Example 1 is an integrated circuit that generates a dot product of first and second vectors, and includes a first specialized processing block that provides a first partial result of a first floating-point precision, and a second specialized processing block that receives the first partial result via a cascade connection from the first specialized processing block and includes first floating-point arithmetic operator circuitry that generates a second partial result having the first floating-point precision based on a quaternary reduction of two tuples having a second floating-point precision from each of the first and second vectors, and second floating-point arithmetic operator circuitry that generates the dot product by performing a binary reduction of the first and second partial results.

Example 2 includes the subject matter of Example 1, wherein the first floating-point arithmetic operator circuitry further includes a first multiplier circuit that generates a first product based on a first tuple of the two tuples from the first vector and a first tuple of the two tuples from the second vector, wherein the first product has the second floating-point precision, and a second multiplier circuit that generates a second product based on a second tuple of the two tuples from the first vector and a second tuple of the two tuples from the second vector, wherein the second product has the second floating-point precision.

Example 3 includes the subject matter of Example 2, wherein the first floating-point arithmetic operator circuitry further includes an adder circuit that generates a sum of the first and second products, wherein the sum has the second floating-point precision.

Example 4 includes the subject matter of Example 3, wherein the first floating-point arithmetic operator circuitry further includes a cast function circuit that receives the sum from the adder circuit and generates the second partial result by converting the sum from the second floating-point precision into the first floating-point precision.

Example 5 includes the subject matter of Example 4, wherein the cast function circuit increases the exponent size of the sum from the second to the first floating-point precision.

Example 6 includes the subject matter of any one of Examples 4 or 5, wherein the cast function circuit adjusts the bias of the exponent of the sum from the bias of the second floating-point precision to the bias of the second floating-point precision.

Example 7 includes the subject matter of any one of Examples 4-6, wherein the second specialized processing block further includes an output port that is coupled to the second floating-point arithmetic operator circuitry, and a bypass path between the adder circuit and the output port, wherein the bypass path bypasses the cast function circuit and the second floating-point arithmetic operator circuitry.

Example 8 includes the subject matter of any one of Examples 1-7, wherein the second floating-point arithmetic operator circuitry further includes an adder circuit that generates the dot product by adding the first and second partial results.

Example 9 is a method for operating an integrated circuit that generates a dot product of first and second vectors, including generating a first partial result of a first floating-point precision with a first specialized processing block, providing the first partial result at a cascade output of the first specialized processing block, receiving the first partial result via a cascade connection from the cascade output of the first specialized processing block at a cascade input of a second specialized processing block, generating a second partial result having the first floating-point precision based on a quaternary reduction of two tuples having a second floating-point precision from each of the first and second vectors in the second specialized processing block, and generating the dot product by performing a binary reduction of the first and second partial results in the second specialized processing block.

Example 10 includes the subject matter of Example 9, wherein generating the second partial result further includes using a first multiplier circuit to generate a first product based on a first tuple of the two tuples from the first vector and a first tuple of the two tuples from the second vector, wherein the first product has the second floating-point precision, and using a second multiplier circuit to generate a second product based on a second tuple of the two tuples from the first vector and a second tuple of the two tuples from the second vector, wherein the second product has the second floating-point precision.

Example 11 includes the subject matter of Example 10, further including using an adder circuit to generate a sum of the first and second products, wherein the sum has the second floating-point precision.

Example 12 includes the subject matter of Example 11, further including using a cast function circuit that receives the sum from the adder circuit and generates the second partial result by converting the sum from the second floating-point precision into the first floating-point precision.

Example 13 includes the subject matter of Example 12, further including with the cast function circuit, increasing the exponent size of the sum from the second to the first floating-point precision.

Example 14 includes the subject matter of any one of Examples 12 or 13, further including with the cast function circuit, adjusting the bias of the exponent of the sum from the bias of the second floating-point precision to the bias of the second floating-point precision.

Example 15 includes the subject matter of any one of Examples 12-14, further including bypassing the cast function circuit on a bypass path that couples the adder circuit to an output port of the second specialized processing block.

Example 16 is a non-transitory machine readable storage medium encoded with instructions for configuring an integrated circuit device to generate a dot product of first and second vectors, wherein the integrated circuit device includes first and second specialized processing blocks that are coupled by a cascade connection, wherein the first and second specialized processing blocks each include first and second floating-point arithmetic operator circuitry and configurable interconnection circuitry, the instructions including instructions to configure the first floating-point arithmetic operator circuitry in the first specialized processing block to generate a first partial result having a first floating-point precision based on a first quaternary reduction of first two tuples having a second floating-point precision from each of the first and second vectors, instructions to configure the configurable interconnection circuitry in the first and second specialized processing blocks to route the first partial result from the first floating-point arithmetic operator circuitry in the first specialized processing block via the cascade connection to the second arithmetic operator circuitry in the second specialized processing block, instructions to configure the first floating-point arithmetic operator circuitry in the second specialized processing block to generate a second partial result having the first floating-point precision based on a second quaternary reduction of second two tuples having the second floating-point precision from each of the first and second vectors, and instructions to configure the second floating-point arithmetic operator circuitry in the second specialized processing block to generate the dot product by performing a binary reduction of the first and second partial results.

Example 17 includes the subject matter of Example 16, further including instructions to generate the instructions of Example 16.

Example 18 includes the subject matter of any one of Examples 16 or 17, wherein the instructions to configure the first floating-point arithmetic operator circuitry in the first specialized processing block further include instructions to configure a first multiplier circuit to generate a first product based on a first tuple of the first two tuples from the first vector and a first tuple of the first two tuples from the second vector, wherein the first product has the second floating-point precision, and instructions to configure a second multiplier circuit to generate a second product based on a second tuple of the first two tuples from the first vector and a second tuple of the first two tuples from the second vector, wherein the second product has the second floating-point precision.

Example 19 includes the subject matter of Example 18, wherein the instructions to configure the first floating-point arithmetic operator circuitry in the first specialized processing block further include instructions to configure an adder circuit to generate a sum of the first and second products, wherein the sum has the second floating-point precision.

Example 20 includes the subject matter of Example 19, wherein the instructions to configure the first floating-point arithmetic operator circuitry in the first specialized processing block further include instructions to configure a cast function circuit to generate the second partial result by converting the sum from the second floating-point precision into the first floating-point precision.

Example 21 includes the subject matter of Example 20, further including instructions to increase the exponent size of the sum from the second to the first floating-point precision.

Example 22 includes the subject matter of any one of Examples 20 or 21, further including instructions to adjust the bias of the exponent of the sum from the bias of the second floating-point precision to the bias of the first floating-point precision.

Example 23 includes the subject matter of Example 19, wherein the instructions to configure the second floating-point arithmetic operator circuitry in the second specialized processing block to generate the dot product by performing a binary reduction of the first and second partial results further include instructions to add the first and second partial results.

Example 24 is an integrated circuit for generating a dot product of first and second vectors, including a first specialized processing block for providing a first partial result of a first floating-point precision, and a second specialized processing block that receives the first partial result via a cascade connection from the first specialized processing block and includes first means for generating a second partial result having the first floating-point precision based on a quaternary reduction of two tuples having a second floating-point precision from each of the first and second vectors, and second means for generating the dot product by performing a binary reduction of the first and second partial results.

Example 25 includes the subject matter of Example 24, further including a storage circuit for storing at least one tuple of the first vector.

Example 26 includes the subject matter of Example 25, wherein the storage circuit is selected from the group consisting of a first-in first-out circuit, a last-in first-out circuit, a serial-in parallel-out shift register circuit, a random-access memory circuit, a read-only memory circuit, a content-addressable memory circuit, and a register file.

Example 27 includes the subject matter of any one of Examples 24 or 25, further including configurable interconnect circuitry that includes interconnection resources for routing the first and second vectors to the first and second specialized processing blocks.

Example 28 includes the subject matter of Example 27, wherein the interconnection resources outside the first and second specialized processing blocks further include vertical interconnection resources, and horizontal interconnection resources.

Example 29 includes the subject matter of Example 28, further including a plurality of conductive lines.

Example 30 includes the subject matter of Example 29, further including a programmable connection between a first conductive line of the plurality of conductive lines and a second conductive line of the plurality of conductive lines.

Example 31 includes the subject matter of any one of Examples 28-30, wherein the vertical and horizontal interconnection resources route signals on the integrated circuit.

Example 32 includes the subject matter of Example 27, wherein the configurable interconnect circuitry further includes a plurality of multiplexers.

Example 33 includes the subject matter of Example 32, further including a multiplexer of the plurality of multiplexers that selects between a first output of a cast function circuit and a second output of a multiplier stage.

Example 34 includes the subject matter of any one of Examples 24, 25 or 27, further including a programmable logic region.

Example 35 includes the subject matter of Example 34, wherein the programmable logic region further includes a plurality of logic blocks selected among the group consisting of logic array blocks and configurable logic blocks.

Example 36 includes the subject matter of Example 35, wherein at least one logic block of the plurality of logic blocks further includes a plurality of logic block components.

Example 37 includes the subject matter of Example 36, wherein at least one logic block component of the plurality of logic block components is selected from the group consisting of a look-up table circuit, a register, a slice, an additional adder, and a shift register.

The above described embodiments are presented for purposes of illustration and not of limitation, and the present invention is limited only by the claims that follow.

What is claimed is:

1. An integrated circuit device that generates a dot product from a plurality of vectors, comprising:
  a plurality of specialized processing blocks that each comprises:
    a plurality of inputs that receives at least a portion of a plurality of vectors having a first floating point precision level;
    arithmetic circuitry generates a partial product based on quaternary reduction of two tuples from each of two vectors of the plurality of vectors, wherein each of the partial products has a second floating point precision level, wherein the second floating point precision level is higher than the first floating point precision level; and
    a cast function circuit to reduce each of the partial products to the first floating point precision level;
  one or more cascade connections to pass one or more of the partial products to a summing specialized processing block of the plurality of specialized processing blocks including an adder that adds the one or more partial products to a partial product of the partial products corresponding to the one or more cascade connections; and
  an output to output the dot product.

2. The integrated circuit device of claim 1, wherein each arithmetic circuitry comprises:
a first multiplier circuit that generates a first product based on a first tuple of the two respective tuples from a first vector of the two vectors and a first tuple of the two respective tuples from a second vector of the two vectors, wherein the first product has the second floating-point precision; and
a second multiplier circuit that generates a second product based on a second tuple of the two tuples from the first vector and a second tuple of the two tuples from the second vector, wherein the second product has the second floating-point precision.

3. The integrated circuit of claim 2, wherein the arithmetic circuitry comprises an adder circuit that generates a sum of the first and second products.

4. The integrated circuit of claim 3, wherein the cast function circuit receives the sum from the adder circuit and generates the respective partial product by converting the sum from the second floating-point precision level to the first floating-point precision level.

5. The integrated circuit of claim 4, wherein the cast function circuit increases an exponent size of the sum from the second floating-point precision level to the first floating-point precision level.

6. The integrated circuit of claim 4, wherein the cast function circuit adjusts a bias of the exponent of the sum from a bias of the second floating-point precision level to a bias of the second floating-point precision level.

7. The integrated circuit of claim 4, wherein at least one of the plurality of specialized processing blocks comprises a bypass path between the respective adder circuit and the respective output port, wherein the bypass path bypasses the respective cast function circuit and the respective arithmetic circuitry.

8. The integrated circuit of claim 1, wherein at least one of the plurality of specialized processing blocks comprises an output that is coupled to dummy adder that receives no inputs during calculation of the dot product.

9. A method for operating an integrated circuit that generates a dot product of first and second vectors, comprising:
generating a first partial product with a first specialized processing block based on a first reduction of tuples of the first and second vector, wherein the first and second vectors both have a first floating-point precision level, and the first partial product has a second floating-point precision level;
transmitting the first partial product at a cascade output of the first specialized processing block to a cascade input of a second floating-point precision level;
generating a second partial product with the second specialized processing block based on a second reduction of the first and second vector, wherein the second partial product has a second floating-point precision level; and
generating the dot product by performing a binary reduction of the first and second partial products in the second specialized processing block.

10. The method of claim 9, wherein generating the first partial product based on the first reduction of tuples comprises:
using a first multiplier circuit of the first specialized processing block to generate a first product based on a first tuple of two tuples from the first vector and a first tuple of two tuples from the second vector, wherein the first product has the second precision level; and
using a second multiplier circuit to generate a second product based on a second tuple of the two tuples from the first vector and a second tuple of the two tuples from the second vector, wherein the second product has the second precision level.

11. The method of claim 10, wherein generating the first partial product based on the first reduction of tuples comprises using an adder circuit of the first partial product to generate a sum of the first and second products, wherein the sum has the second floating-point precision as the first partial product.

12. The method of claim 9, wherein generating the second partial product based on the second reduction of tuples comprises:
using a first multiplier circuit of the second specialized processing block to generate a first product based on a first tuple of two tuples from the first vector and a first tuple of two tuples from the second vector, wherein the first product has the second precision level; and
using a second multiplier circuit to generate a second product based on a second tuple of the two tuples from the first vector and a second tuple of the two tuples from the second vector, wherein the second product has the second precision level.

13. The method of claim 12, wherein generating the first partial product based on the first reduction of tuples comprises using an adder circuit of the first partial product to generate a sum of the first and second products, wherein the sum has the second floating-point precision as the first partial product.

14. The method of claim 9, wherein performing the binary reduction comprises:
using a first cast function circuit of the first specialized processing block that receives the first partial product and converts the first partial product to the first precision level before performing the binary reduction; and
using a second cast function circuit of the second specialized processing block that receives the second partial product and converts the second partial product to the first precision level before performing the binary reduction.

15. The method of claim 14, wherein converting the first and second partial products to the first floating-point level comprises increasing respective exponent sizes of the first and second partial products.

16. The method of claim 14, wherein converting the first and second partial products to the first floating-point level comprises adjusting respective biases of the exponents of the first and second partial products.

17. The method of claim 9, wherein the first reduction comprises a quaternary reduction of two tuples of the first and second vectors.

18. The method of claim 9, wherein the second reduction comprises a quaternary reduction of two tuples of the first and second vectors.

19. A tangible, non-transitory, and computer-readable medium encoded with instructions for configuring first and second specialized processing blocks of an integrated circuit to generate a dot product of first and second vectors, wherein the instructions are configured to cause a processor to:
configure the first specialized processing block to generate a first partial product based on a first quaternary reduction of tuples of the first and second vector, wherein the first and second vectors both have a first floating-point precision level, and the first partial product has a second floating-point precision level;

configured the first and second specialized processing blocks to transmit the first partial product at a cascade output of the first specialized processing block to a cascade input of a second floating-point precision level;

configure the second specialized processing block to generate a second partial product based on a second quaternary reduction of tuples of the first and second vector, wherein the second partial product has a second floating-point precision level; and configure the second specialized processing block to generate the dot product by performing a binary reduction of the first and second partial products in the second specialized processing block.

20. The tangible, non-transitory, and computer-readable medium of claim 19, wherein:

configuring the first specialized processing block to generate the first partial product comprises the first specialized processing block to multiply each pair together of a first set of pairs of tuples from the first quaternary reduction and sum first results of the multiplication of the pairs of the first set of pairs of tuples;

configuring the second specialized processing block to generate the second partial product comprises the second specialized processing block to multiply each pair together of a second set of pairs of tuples from the second quaternary reduction and sum second results of the multiplication of the pairs of the second set of pairs of tuples; and performing the binary reduction comprises configuring the second specialized processing block to add the first and second partial products together using an adder of the second specialized processing block.

\* \* \* \* \*